US007606679B1

(12) United States Patent
Voicu et al.

(10) Patent No.: US 7,606,679 B1
(45) Date of Patent: Oct. 20, 2009

(54) DIAGNOSTIC AND MAINTENANCE SYSTEMS AND METHODS FOR LED POWER MANAGEMENT INTEGRATED CIRCUITS

(75) Inventors: Gelu Voicu, San Jose, CA (US); Leonard Gagea, Vienna (AT); Anthony Russell, San Jose, CA (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 0 days.

(21) Appl. No.: 11/535,047

(22) Filed: Sep. 25, 2006

(51) Int. Cl.
*G06F 11/30* (2006.01)

(52) U.S. Cl. ....................................... 702/183; 702/185

(58) Field of Classification Search ................. 702/183, 702/185, 187
See application file for complete search history.

(56) References Cited

U.S. PATENT DOCUMENTS

| | | | | |
|---|---|---|---|---|
| 5,519,832 | A | 5/1996 | Warchol | |
| 5,983,286 | A | 11/1999 | Pakenham | |
| 6,049,879 | A | 4/2000 | Davis et al. | |
| 6,448,716 | B1 | 9/2002 | Hutchison | |
| 6,467,054 | B1 | 10/2002 | Lenny | |
| 6,490,512 | B1 | 12/2002 | Niggemann | |
| 6,502,044 | B1 * | 12/2002 | Lane et al. | 702/63 |
| 6,687,627 | B1 | 2/2004 | Gunn et al. | |
| 6,718,472 | B1 | 4/2004 | Garnett | |
| 6,868,492 | B1 | 3/2005 | McCarty et al. | |
| 6,871,150 | B2 | 3/2005 | Huber et al. | |
| 6,985,343 | B2 * | 1/2006 | Mirowski et al. | 361/93.2 |
| 7,020,543 | B1 | 3/2006 | Jaeschke et al. | |
| 2005/0112801 | A1 * | 5/2005 | Russell et al. | 438/116 |

OTHER PUBLICATIONS

Shini, Mohanad, "System On Chip—SoC," 2005, www.cs.huji.ac.il/course/2004/dft/Presentations/Summer%202005/Mohanad%20-%20System%20On%20Chip%(SOC).ppt (viewed Mar. 2007).*

"Configurable System-on-Chip Card: SoC/Card S1," Feb. 13, 2000, SSV Embedded Systems, http://www.ssv-embedded.de/ssv/pc104/p157.htm.*

Melexis, IC Specification MLX 10801, document footer contains note Mar. 25, 2003.

Uyemura, "Introduction to VLSI Circuits and Systems," Chapter 13, pp. 483-519, John Wiley & Sons, Inc., New York, 2001.

EE Times, "Virage nonvolatile memory to be built in logic process," 3 pages, available at http://www.eetimes.com/story/OEG20020225S0032, article dated Feb. 25, 2002.

* cited by examiner

*Primary Examiner*—Bryan Bui
(74) *Attorney, Agent, or Firm*—Law Office of Andrei D. Popovici, PC

(57) ABSTRACT

According to some embodiments, a light emitting diode (LED) power management and diagnostics history recording integrated circuit includes a power management circuit controlling a supply of power to the LED, a diagnostics detection circuit recording a diagnostics history for the LED, a non-volatile diagnostics history memory storing the diagnostics history; and an external interface for transferring externally the diagnostics history stored in the non-volatile diagnostics history memory. The diagnostics history includes diagnostics data for at least two sequential occurrences of a reoccurring fault condition. The diagnostics data may include temperature, under-voltage, over-voltage, open-circuit load, and short-circuit load indicators, among others. A diagnostics analysis system downloads the diagnostics data after a given operation period and performs maintenance decisions according to the diagnostics data. Such systems are particularly useful for diagnosing intermittent faults and/or faults in remotely-located systems, and making maintenance decisions accordingly.

19 Claims, 3 Drawing Sheets

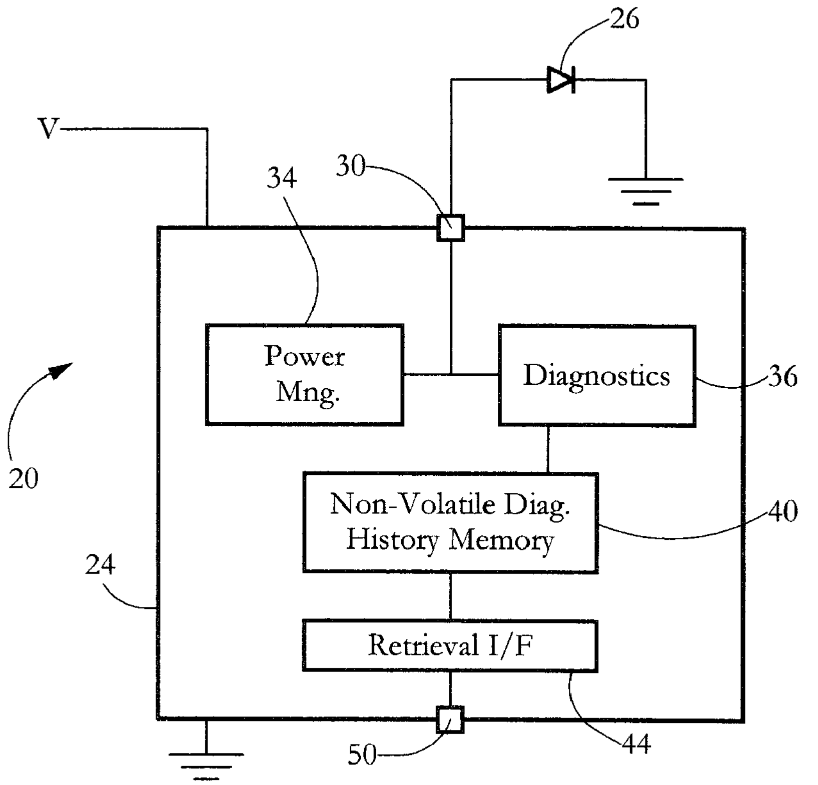
FIG. 1-A
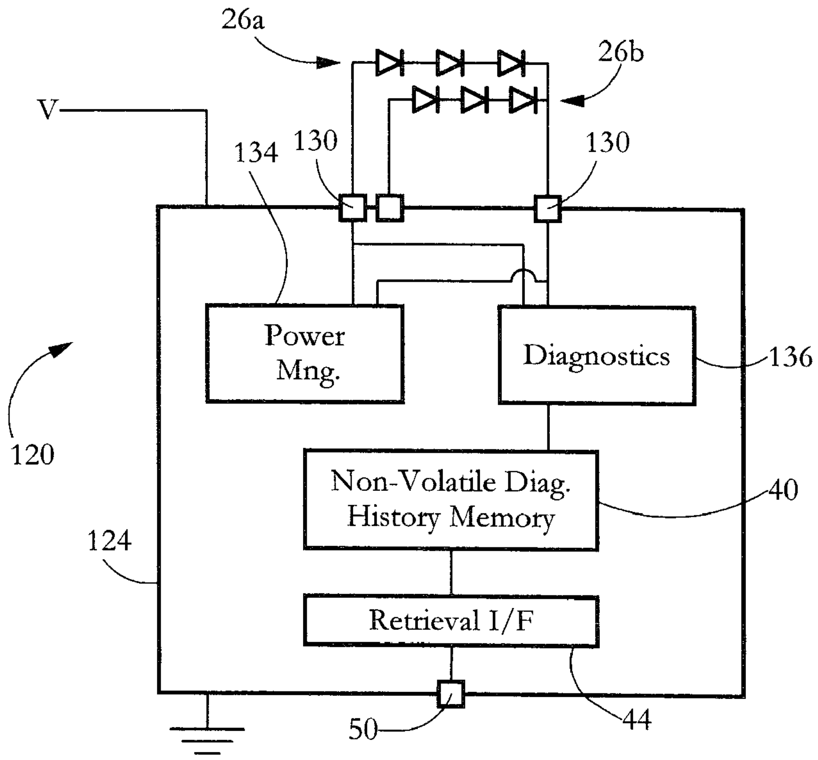
FIG. 1-B

DIAGNOSTIC AND MAINTENANCE SYSTEMS AND METHODS FOR LED POWER MANAGEMENT INTEGRATED CIRCUITS

BACKGROUND

This invention relates to diagnostic systems and methods for power-management integrated circuits, and in particular to diagnostic systems and methods for light emitting diode power-management integrated circuits.

Light emitting diodes (LEDs) are used in a variety of applications, including in automotive applications and in lighting applications in remote locations (e.g. in traffic signals). The operation of LEDs is commonly controlled by driver integrated circuits (ICs). Driver ICs control a set of LED drive parameters such as bias current and duty cycle for a LED or group of LEDs.

Some LED lighting systems include diagnostic circuitry, which may adjust the operation of the LED if a fault is detected. For example, a bias current flow may be reduced upon detection of a high LED operating temperature in order to protect the LED. The system may resume normal operation when the fault condition is removed.

Some LED lighting systems may display a fault indicator to a user when a fault is detected. In U.S. Pat. No. 6,490,512, Niggemann describes a diagnostic system for an LED lamp for a motor vehicle. The diagnostic system has a light control module for controlling an LED lamp via a supply wire. In case of malfunction, the LED lamp sends a diagnostic signal via the supply wire to the light control module. When a malfunction occurs, the light control module stores the malfunction in a non-volatile memory (EEPROM) and displays the malfunction to a vehicle driver on a display element.

Conventional diagnostic systems may be of limited help in diagnosing some device faults, particularly for unsupervised LEDs operating in remote locations.

SUMMARY

According to one aspect, a light emitting system includes a light-emitting diode load, and a diagnostics history and power-management integrated circuit connected to the light-emitting diode load. The diagnostics history and power-management integrated circuit includes a power management circuit configured to control a supply of power to the light emitting diode load, a diagnostics detection circuit connected to the power management circuit and configured to record a set of diagnostics history data for an operation of the light emitting diode load, a non-volatile diagnostics history memory connected to the diagnostic detection circuit and configured to store the set of diagnostics history data, and an external interface connected to the non-volatile diagnostics history memory and configured to transfer externally the set of diagnostics history data stored in the non-volatile diagnostics history memory. The set of diagnostic history data includes diagnostics data for at least two sequential occurrences of a reoccurring fault condition. In some embodiments, the set of diagnostic history data includes occurrence counts for over-temperature, under-voltage, over-voltage, open-circuit, and short-circuit fault conditions. The diagnostics history data may be downloaded to a diagnostics analysis system to facilitate making maintenance decisions for the light-emitting system.

BRIEF DESCRIPTION OF THE DRAWINGS

The foregoing aspects and advantages of the present invention will become better understood upon reading the following detailed description and upon reference to the drawings where:

FIG. 1-A shows an exemplary integrated light-emitting-diode (LED) control and diagnostics system according to some embodiments of the present invention.

FIG. 1-B shows another exemplary integrated LED control and diagnostics system according to some embodiments of the present invention.

DETAILED DESCRIPTION OF PREFERRED EMBODIMENTS

Figure 2:
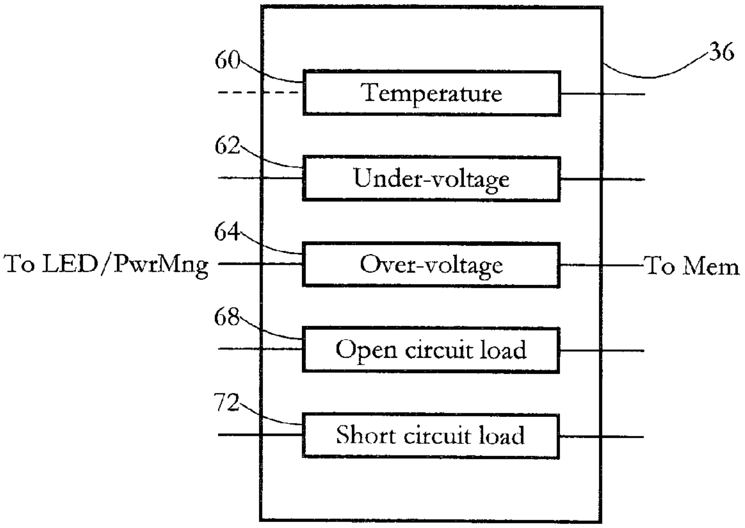
FIG. 2 shows a diagnostics module of the system of FIG. 1-A according to some embodiments of the present invention.

The following description illustrates the present invention by way of example and not necessarily by way of limitation. Any reference to an element is understood to refer to at least one element. A set of elements is understood to include one or more elements. A plurality of elements includes at least two elements. A light emitting diode load may include one or more light emitting diodes. A wide area network is a network including at least one router (e.g. the Internet).

FIG. 1-A shows an exemplary integrated light-emitting-diode (LED) control and diagnostics system 20 according to some embodiments of the present invention. Control/diagnostics system 20 includes an LED load including at least one LED 26, and a control/diagnostics integrated circuit (IC) 24 electrically connected to LED 26. IC 24 includes multiple components formed on a common semiconductor substrate: a power management circuit 34, an LED diagnostics circuit 36, a non-volatile diagnostics history memory 40, and a diagnostics history retrieval interface 44. Control/diagnostics IC 24 is connected externally through a set of LED connection pins 30 and a set of diagnostics retrieval interface pins 50. In the configuration shown in FIG. 1-A, LED 26 is connected between a pin 30 and ground. Control/diagnostics IC 24 is also connected to an external power source.

Power management circuit 34 includes circuitry configured to manage a supply of power to LED 26. In some embodiments, power management circuit 34 includes a bias current control circuit configured to control a current flowing to LED 26 through pins 30. Such a bias current control circuit may include a current mirror and/or current source. In some embodiments, power management circuit 34 may include a brightness control circuit configured to control a brightness of light emitted by LED 26. Such a brightness control circuit may include a switched current regulator or a pulse-width-modulation (PWM) circuit. In some embodiments, power management circuit 34 may include a current derating circuit configured to reduce a bias current supplied to LED 26 in response to a high-temperature indicator received from LED diagnostics circuit 36. In some embodiments, power management circuit 34 may receive power management settings stored in non-volatile diagnostics history memory 40 or in another non-volatile memory, and control the operation of LED 26 according to the stored settings. In some embodiments, power management settings may be stored in memory through diagnostics retrieval interface 44.

Non-volatile diagnostics history memory 40 is a re-programmable non-volatile semiconductor memory such as erasable programmable read-only memory (EPROM), electrically-erasable programmable read-only memory (EEPROM), or flash memory. Memory 40 includes a plurality of memory registers. Memory 40 is capable of retaining stored data when its power is turned off, e.g. when control/diagnostics IC 24 is removed from its power source. Memory 40 is capable of storing diagnostics data for multiple sequential occurrences of a fault condition for each fault sensor type described below, rather than merely a record of a latest error recorded for a given type of error. Examples of diagnostics data include, without limitation, error counts, indicators of individual errors, and indicators of error sequences. For example, memory 40 may store a set of error counts, each indicating a numbers of times that a particular type of fault (e.g. over-temperature, over-voltage) has occurred since a last system reset. Memory 40 may also store an indicator of an error and associated data (e.g. measured temperature or voltage) each time the error occurs.

In some embodiments, the diagnostics history data may include one or more indicators of a relative order of multiple fault occurrences. For example, the diagnostics history data may include an ordered list of all detected faults of all types, and/or the diagnostics history data may include for each error occurrence an order tag indicating the temporal order of the error occurrence relative to other stored error occurrences.

In some embodiments, memory 40 has a capacity on the order 1 kB or higher. In some embodiments, diagnostics data for different error types are stored in a common address range, for example as list of error counts and associated error type flags indicating the different error types. In some embodiments, a plurality of predetermined memory address ranges within memory 40 may be dedicated to corresponding diagnostics sensor data types described below.

Diagnostics history retrieval interface 44 may be a serial interface such as a SPI (Serial Peripheral Interface) or I2C (Inter Integrated Circuit) interface. Diagnostics history retrieval interface 44 allows an external diagnostics history retrieval/analysis system to download the contents of memory 40 upon request.

In some embodiments, an LED load may include multiple LEDs, and may be connected to a control/diagnostics system through multiple pins. FIG. 1-B shows an exemplary integrated light-emitting-diode (LED) control and diagnostics system 120 according to some embodiments of the present invention. Control/diagnostic system 120 includes a control/diagnostics IC 124 including a plurality of LED connection pins 130. A plurality of LED chains 26*a-b* are connected in parallel to control/diagnostics IC 24 through pins 130. Each LED chain 26*a-b* includes a plurality of LEDs connected in series. A power management circuit 134 and an LED diagnostics circuit 136 are connected to pins 130. Control/diagnostics IC 124 further includes memory 40, interface 44, and a set of interface pins 50 as described above. Memory 40 may store configuration data specifying which of the multiple chains 26*a-b* are to be turned on, and/or which of the multiple chains 26*a-b* is to be turned off in response to detection of given faults (e.g. turn off both chains in response to an error detected for one of the chains, or turn off selectively the chain for which an error is detected). Memory 40 may also include a dedicated diagnostics memory address range for each LED chain 26*a-b*. The diagnostics data stored for chains 26*a-b* may include tags indicating which chain 26*a-b* and/or which individual LED within chains 26*a-b* is associated with each recorded fault occurrence.

In some embodiments, a multiple-pin configuration as shown in FIG. 1-B may be used with an LED load formed by a single LED, while in some embodiments an LED load formed by multiple LEDs may be connected through a single pin as shown in FIG. 1-A.

FIG. 2 shows an internal structure of LED diagnostics circuit 36 according to some embodiments of the present invention. LED diagnostics circuit 36 includes a temperature sensor 60, an under-voltage detection circuit 62, an over-voltage detection circuit 64, an open circuit load detection circuit 68, and a short circuit load detection circuit 72. In some embodiments, the sensor/circuit set shown in FIG. 2 may be duplicated for each of multiple LEDs and/or LED chains connected to LED diagnostics circuit 36. In some embodiments, each circuit shown in FIG. 2 is allocated a predetermined memory address range within memory 40, and specifies to memory 40 the memory address for each diagnostics data item to be written to memory 40.

Temperature sensor 60 includes a temperature sensing circuit that uses one or more signals from one or more temperature sensing elements to generate temperature indicators indicative of the temperature of LED 26 and/or IC 24. In some embodiments, temperature sensor 60 may include or be coupled to an on-chip temperature sensing element, such as a diode, which senses a temperature of IC 24. In some embodiments, temperature sensor 60 may be coupled to an off-chip temperature sensing element thermally coupled to LED 26, which senses a temperature of LED 26. The temperature sensing circuit may include a window comparator for detecting whether a known temperature-dependent characteristic of the temperature sensing element meets a predetermined condition.

Under-voltage detection circuit 62 measures a voltage applied to LED 26 by power management circuit 34, and generates an under-voltage signal when the applied voltage is below a predetermined threshold. The under-voltage detection threshold may be chosen according to (e.g. set equal to) the voltage needed by the LED load of interest to operate. For example, for an LED chain of 3 LEDs connected in series, with each LED having a 3V threshold voltage, the under-voltage detection threshold may be set to the sum of the LED thresholds, i.e. 9 V. For such a series load, very little or no current will flow through the LEDs for applied voltages under 9V.

Over-voltage detection circuit 64 measures the voltage applied to LED 26 by power management circuit 34, and generates an over-voltage signal when the applied voltage is over a predetermined threshold. The over-voltage detection threshold may be chosen according to a maximum voltage that IC 24 and/or LED 26 can handle safely in normal operation. In some embodiments, over-voltage detection circuit 64 may also detect when an excessive external voltage is applied to power management circuit 34. In some embodiments, under-voltage detection circuit 62 and over-voltage detection circuit 64 may form parts of a voltage measurement circuit.

Open-circuit load detection circuit 68 determines whether the circuit including pins 30 and LED 26 is open, and generates an open circuit signal when the circuit is open. Open-circuit load detection circuit 68 may include circuitry configured to apply a voltage higher than the voltage needed by the LED load of interest to operate, and to detect the presence of current flow in response to the applied voltage. For example, for an LED load of three LEDs connected in series, each with a 3 V threshold voltage, open load detection circuit 68 may include a circuit capable of applying a voltage of at least 9V across the LED load.

Short-circuit load detection circuit 72 determines whether LED 26 provides a short-circuit current path, and generates a short-circuit signal when the LED 26 has short-circuited. A short-circuit may be detected by applying a test current and detecting whether a resulting voltage exceeds a predetermined threshold. The short circuit signal may be used shut off power selectively to the channel for which a short-circuit has been detected. In some embodiments, if IC 24 is capable of connecting to multiple LED chains connected in parallel, unused channels may be tied high (short-circuited) in order to prevent the application of power to the unused channel terminals.

Figure 3:
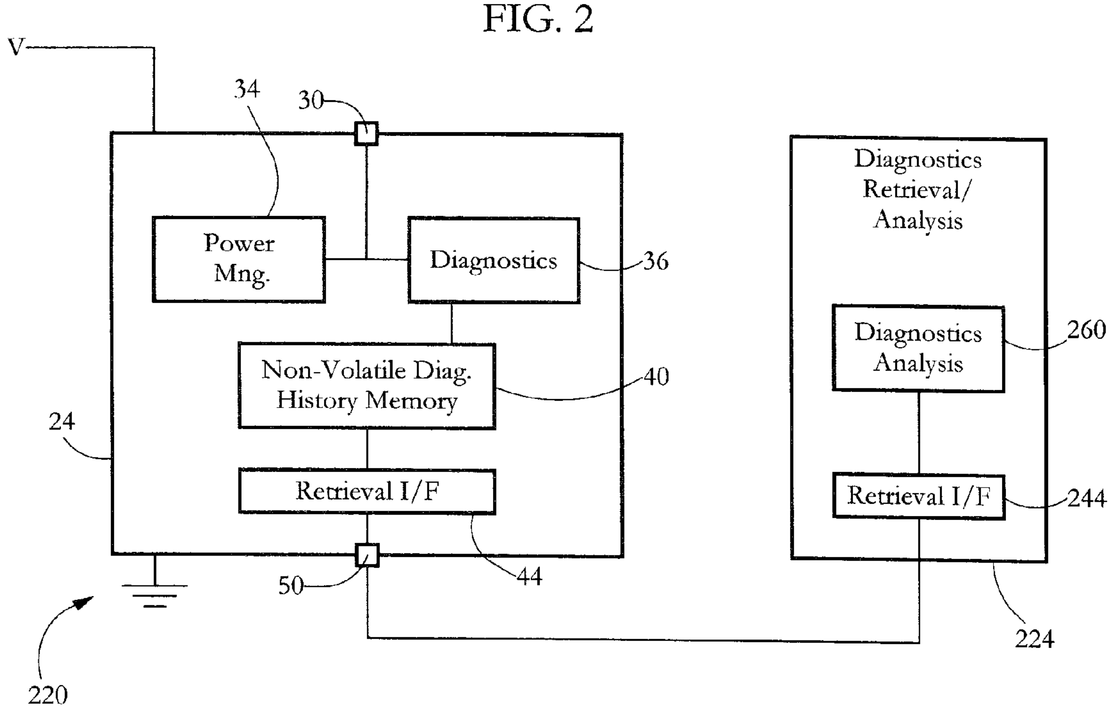
FIG. 3 illustrates a retrieval of diagnostics history data from the system of FIG. 1-A according to some embodiments of the present invention.

FIG. 3 illustrates a retrieval of diagnostics history data from the system of FIG. 1-A according to some embodiments of the present invention. A diagnostics recording and analysis system 220 includes control/diagnostics IC 24, and a diagnostics analysis system 224 connected to control/diagnostics IC 24 through pins 50. Diagnostics analysis system 224 may include a general purpose computer. Diagnostics analysis system 224 includes a retrieval interface 244 configured to connect to interface 44, and a diagnostics analysis module 260 connected to retrieval interface 244. During a data retrieval process, retrieval interface 244 connects to IC 24 and retrieves diagnostics history data stored in memory 40, and/or direct and erasure of the data stored in memory 40 if desired. Diagnostics analysis module 260 receives the diagnostics history data and performs a data analysis sequence. In some embodiments, diagnostics data may be retrieved while LED 26 is connected to IC 24.

Figure 4:
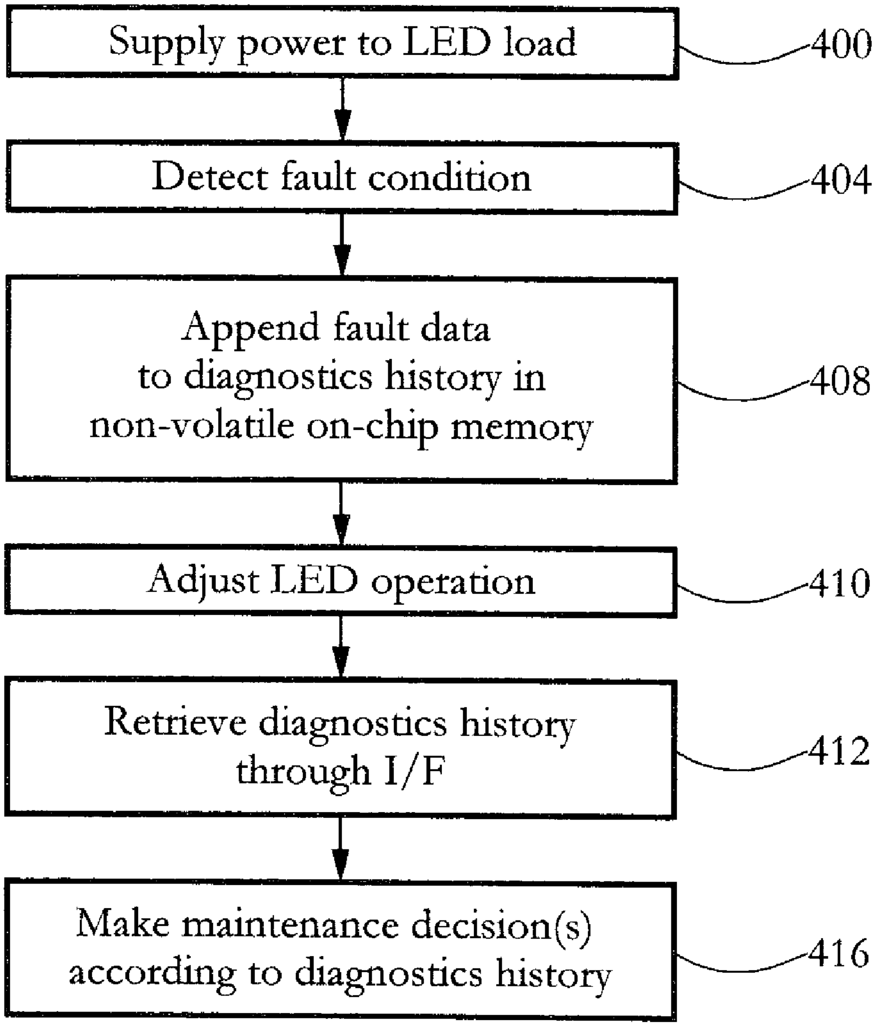
FIG. 4 shows a sequence of steps performed by an integrated LED control and diagnostics system and an associated diagnostics history analysis system according to some embodiments of the present invention.

FIG. 4 shows a sequence of steps performed by diagnostics recording and analysis system 220 (FIG. 3) according to some embodiments of the present invention. In a step 400, control/diagnostics IC 24 supplies power to its LED load. Step 400 may be performed before, during and/or after a number of steps described below are performed. When diagnostics circuit 36 detects a fault condition (step 404), a set of fault data are appended to diagnostics history data in non-volatile diagnostics history memory 40 (step 408). In a step 410, power management circuit 34 employs the fault data to adjust an operation of the LED load. Adjusting the operation may include changing operating parameters or shutting down the LED load. In a step 412, diagnostics analysis system 224 retrieves the diagnostics history data stored in non-volatile diagnostics history memory 40, through interfaces 44, 244. The diagnostic history data includes a number of times each of a plurality of error types (e.g. excess temperature, over-voltage, under-voltage, open load, short circuit) has occurred since a start of operation/last rest of IC 24. In some embodiments, step 412 may be performed remotely over a wide area network, while IC 24 is connected to its LED load, with the LED load shut down or in operation. In some embodiments, step 412 may be performed while IC 24 is connected to diagnostics analysis 224 but not its LED load. In a step 416, diagnostics analysis circuit 260 and/or a human operator may make a maintenance decision for IC 24 and its LED load according to the retrieved diagnostics history. The maintenance decision may include determining whether or when to perform a maintenance operation on IC 24 and/or its LED load. Performing a maintenance operation may include replacing IC 24 and/or its LED load.

The exemplary systems and methods described above allow improved diagnoses of LED and associated circuit conditions, particularly for intermittent faults and/or for systems situated at remote locations. A non-volatile diagnostics history register integrated on a semiconductor substrate with power management and diagnostics detection circuitry allows convenient, low cost storage of diagnostics history data over extended periods of LED operation, which may include operation over varying external conditions that may give rise to intermittent faults. Subsequently downloaded diagnostics history data may be used for making maintenance and/or design changes to the LED and/or associated components.

It will be clear to one skilled in the art that the above embodiments may be altered in many ways without departing from the scope of the invention. Accordingly, the scope of the invention should be determined by the following claims and their legal equivalents.

What is claimed is:

1. A light-emitting system comprising:

a light-emitting diode load; and a diagnostics history and power-management integrated circuit connected to the light-emitting diode load, the diagnostics history and power-management integrated circuit comprising:

a power management circuit configured to control a supply of power to the light emitting diode load;

a diagnostics detection circuit connected to the power management circuit and configured to record a set of diagnostics history data for an operation of the light emitting diode load, the set of diagnostics history data including diagnostics data for at least two sequential occurrences of a reoccurring fault condition, the set of diagnostics history data including indicators of a relative order of occurrence of a plurality of occurrences of a plurality of fault conditions;

a non-volatile diagnostics history memory connected to the diagnostics detection circuit and configured to store the set of diagnostics history data; and an external interface connected to the non-volatile diagnostics history memory and configured to transfer externally the set of diagnostics history data stored in the non-volatile diagnostics history memory.

2. The system of claim 1, wherein:

the reoccurring fault condition is an over-temperature condition for a device selected from the light emitting diode load and the diagnostics history and power management integrated circuit; and the diagnostics detection circuit includes a temperature detection circuit configured to generate a temperature indicator indicative of a temperature of the device.

3. The system of claim 1, wherein:

the reoccurring fault condition comprises an under-voltage condition for the light emitting diode load; and the diagnostics detection circuit includes an under-voltage detection circuit configured to generate an under-voltage indicator indicative of the under-voltage condition.

4. The system of claim 1, wherein:

the reoccurring fault condition comprises an over-voltage condition for the light emitting diode load; and the diagnostics detection circuit includes an over-voltage detection circuit configured to generate an over-voltage indicator indicative of the over-voltage condition.

5. The system of claim 1, wherein:

the reoccurring fault condition comprises an open circuit condition for the light emitting diode load; and the diagnostics detection circuit includes an open circuit detection circuit configured to generate an open circuit indicator indicative of the open circuit condition.

6. The system of claim 1, wherein:

the reoccurring fault condition comprises a short-circuit condition for the light emitting diode load; and the diagnostics detection circuit includes a short-circuit detection circuit configured to generate a short-circuit indicator indicative of the short-circuit condition.

7. The system of claim 1, wherein the set of diagnostics history data includes a plurality of fault type occurrence counts each indicative of a number of detected occurrences of a corresponding fault type.

8. The system of claim 7, wherein the plurality of fault type occurrence counts includes an over-temperature count, an under-voltage count, an over-voltage count, an open circuit count, and a short circuit count.

9. A diagnostics history and power management integrated circuit comprising:

a power management circuit configured to control a supply of power to a light emitting diode load;

a diagnostics detection circuit connected to the power management circuit and configured to record a set of diagnostics history data for an operation of the light emitting diode load, the set of diagnostics history data including diagnostics data for at least two sequential occurrences of a reoccurring fault condition, the set of diagnostics history data including indicators of a relative order of occurrence of a plurality of occurrences of a plurality of fault conditions;

a non-volatile diagnostics history memory connected to the diagnostics detection circuit and configured to store the set of diagnostics history data; and an external interface connected to the non-volatile diagnostics history memory and configured to transfer externally the set of diagnostics history data stored in the non-volatile diagnostics history memory.

10. A diagnostics history recording and retrieval system comprising:

a light emitting diode diagnostics history and power-management integrated circuit comprising:

a power management circuit configured to control a supply of power to a light emitting diode load;

a diagnostics detection circuit connected to the power management circuit and configured to record a set of diagnostics history data for an operation of the light emitting diode load, the set of diagnostics history data including diagnostics data for at least two sequential occurrences of a reoccurring fault condition, the set of diagnostics history data including indicators of a relative order of occurrence of a plurality of occurrences of a plurality of fault conditions;

a non-volatile diagnostics history memory connected to the diagnostics detection circuit and configured to store the set of diagnostics history data; and an external interface connected to the non-volatile diagnostics history memory and configured to transfer externally the set of diagnostics history data stored in the non-volatile diagnostics history memory; and a diagnostics history analysis system connected to the external interface and configured to receive the set of diagnostics history data through the external interface.

11. The system of claim 10, wherein the diagnostics history analysis system is configured to generate a maintenance determination for the light emitting diode according to the set of diagnostics history data.

12. The system of claim 10, wherein the diagnostics history analysis system is connected to the external interface over a wide area network.

13. A light emitting diode diagnostics and power management method comprising:

employing a diagnostics history and power-management integrated circuit connected to a light-emitting diode load to control a supply of power to the light emitting diode load;

record a set of diagnostics history data for an operation of the light emitting diode load, the set of diagnostics history data including diagnostics data for at least two sequential occurrences of a reoccurring fault condition, the set of diagnostics history data including indicators of a relative order of occurrence of a plurality of occurrences of a plurality of fault conditions;

store the set of diagnostics history data in a non-volatile diagnostics history memory of the diagnostics history and power management integrated circuit; and transferring the set of diagnostics history data stored in the non-volatile diagnostics history memory to a diagnostics history analysis system external to the diagnostics history and power management integrated circuit.

14. The method of claim 13, wherein the set of diagnostics history data includes a set of temperature history data for the light emitting diode load.

15. The method of claim 13, wherein the set of diagnostics history data includes a set of under-voltage history data for the light emitting diode load.

16. The method of claim 13, wherein the set of diagnostics history data includes a set of over-voltage history data for the light emitting diode load.

17. The method of claim 13, wherein the set of diagnostics history data includes a set of open circuit history data for the light emitting diode load.

18. The method of claim 13, wherein the set of diagnostics history data includes a set of short-circuit history data for the light emitting diode load.

19. A system comprising:

a light-emitting diode load; and a diagnostics history and power-management integrated circuit connected to the light-emitting diode load, the diagnostics history and power-management integrated circuit comprising:

means for controlling a supply of power to the light emitting diode load;

means for recording a set of diagnostics history data for an operation of the light emitting diode load, the set of diagnostics history data including diagnostics data for at least two sequential occurrences of a reoccurring fault condition, the set of diagnostics history data including indicators of a relative order of occurrence of a plurality of occurrences of a plurality of fault conditions;

a non-volatile diagnostics history memory configured to store the set of diagnostics history data; and means for transferring externally the set of diagnostics history data stored in the non-volatile diagnostics history memory.

* * * * *